(12) United States Patent
Harkin

(10) Patent No.: US 7,566,222 B2
(45) Date of Patent: Jul. 28, 2009

(54) METHOD, APPARATUS AND KIT FOR DEMONSTRATING THE USE OF ABSORBENT PRODUCTS

(75) Inventor: Thomas Harkin, Tiverton, RI (US)

(73) Assignee: First Quality Retail Services, LLC, Great Neck, NY (US)

( * ) Notice: Subject to any disclaimer, the term of this patent is extended or adjusted under 35 U.S.C. 154(b) by 525 days.

(21) Appl. No.: 10/986,921

(22) Filed: Nov. 12, 2004

(65) Prior Publication Data

US 2006/0105316 A1    May 18, 2006

(51) Int. Cl.
    *G09B 23/28* (2006.01)
(52) U.S. Cl. .................. 434/267; 434/262; 434/268
(58) Field of Classification Search ......... 434/262–275, 434/295–297; 73/73, 866.4, 38; 446/296, 446/298, 305, 354; 223/72; 138/72; 137/118.06; 222/632–633; 604/361; 340/604; 141/242, 141/243
See application file for complete search history.

(56) References Cited

U.S. PATENT DOCUMENTS

| | | | | |
|---|---|---|---|---|
| 1,332,293 A | * | 3/1920 | Hanger | 417/526 |
| 2,034,446 A | * | 3/1936 | Saxe | 434/273 |
| 3,472,434 A | * | 10/1969 | Cherry et al. | 223/67 |
| 3,650,093 A | * | 3/1972 | Rosenberg | 96/6 |
| 3,835,703 A | * | 9/1974 | Bush | 73/147 |
| 4,087,933 A | * | 5/1978 | Strongin | 446/183 |
| 5,381,839 A | * | 1/1995 | Dowd | 141/242 |
| 5,467,543 A | * | 11/1995 | Fink et al. | 40/538 |
| 5,821,179 A | | 10/1998 | Masaki et al. | |
| 6,187,872 B1 | * | 2/2001 | Yanase et al. | 525/330.2 |
| 6,234,804 B1 | * | 5/2001 | Yong | 434/267 |
| 6,298,714 B1 | * | 10/2001 | Courtray | 73/73 |
| 6,446,495 B1 | * | 9/2002 | Herrlein et al. | 73/73 |
| 6,557,398 B2 | * | 5/2003 | Lindmark et al. | 73/73 |
| 7,109,035 B2 | * | 9/2006 | Haddad | 436/8 |
| 7,174,774 B2 | * | 2/2007 | Pawar et al. | 73/73 |
| 2004/0101814 A1 | * | 5/2004 | Morris et al. | 434/268 |
| 2004/0118225 A1 | * | 6/2004 | Wright et al. | 73/866 |
| 2007/0048709 A1 | | 3/2007 | Ales, III et al. | |

* cited by examiner

*Primary Examiner*—Xuan M Thai
*Assistant Examiner*—Timothy Musselman
(74) *Attorney, Agent, or Firm*—Amster, Rothstein & Ebernstein LLP

(57) ABSTRACT

An apparatus is provided for demonstrating an absorbent product. The apparatus includes a torso-shaped manikin on which an absorbent product can be donned. An inlet is positioned on the manikin to receive synthetic urine, a first outlet is positioned on the manikin to correspond to male anatomy, and a second outlet is positioned on the manikin to correspond to female anatomy. A passageway is positioned in the manikin to direct synthetic urine from the inlet toward the first and second outlets. A method and kit are also provided for demonstrating the absorbent product.

32 Claims, 5 Drawing Sheets

US 7,566,222 B2

METHOD, APPARATUS AND KIT FOR DEMONSTRATING THE USE OF ABSORBENT PRODUCTS

BACKGROUND OF THE INVENTION

It is often advantageous to demonstrate or test the use or performance of absorbent products such as diapers, absorbent undergarments (e.g., adult briefs), pads, or other products intended to absorb bodily fluids. Such demonstrations may be especially helpful for personnel in the hospital, long-term care, or clinical settings. Also, such demonstrations are instructive for buyers responsible for selecting absorbent products so that they can choose an appropriate product based on its performance characteristics.

Traditionally, the use or performance of absorbent products has been demonstrated or tested by placing an absorbent product on a surface and applying a fluid to the absorbent product, thereby demonstrating the ability of that absorbent product to absorb the fluid. Accordingly, typical demonstrations of absorbent products are two dimensional in that they are laid flat on a surface and then exposed to fluid.

For example, a standard countertop pour test can be used to demonstrate or test an absorbent product such as an adult brief. In such a test, the adult brief is held open and flat on a table with the absorbent side up. A fluid is then poured onto the adult brief to illustrate how the absorbent components of the adult brief absorb the fluid.

Though the countertop pour test is useful to illustrate the performance of an absorbent product, it only demonstrates the performance of the absorbent product in two dimensions (i.e., on a flat surface). In use, however, absorbent products such as an adult brief absorbs fluid in three dimensions as it conforms to multiple shapes and sizes (i.e., the curves and contours of the wearer's body). The three dimensional nature of the use of an absorbent product therefore results in a pattern of fluid dispersal and absorption that cannot truly be replicated on a flat surface in a two-dimensional test.

Accordingly, there remains a need for an improved manner of demonstrating the use and/or performance of an absorbent product.

SUMMARY OF THE INVENTION

According to one aspect of the invention, an apparatus is provided for demonstrating an absorbent product. The apparatus includes a torso-shaped manikin on which an absorbent product can be donned. An inlet is positioned on the manikin to receive synthetic urine, a first outlet is positioned on the manikin to correspond to male anatomy, and a second outlet is positioned on the manikin to correspond to female anatomy. A passageway is positioned in the manikin to direct synthetic urine from the inlet toward the first and second outlets.

According to another aspect of the invention, an apparatus is provided that includes an inflatable torso-shaped manikin. The manikin has a deflated condition and an inflated condition, wherein the absorbent product can be donned on the manikin in the inflated condition. An inlet is positioned on the manikin to receive synthetic urine, and at least one outlet is positioned on the manikin. A passageway is positioned in the manikin to direct synthetic urine from the inlet toward the outlet.

According to yet another aspect of the invention, a method is provided for demonstrating an absorbent product using a manikin. The method includes the step of selecting an outlet from a first outlet positioned on the manikin corresponding to male anatomy and a second outlet positioned on the manikin corresponding to female anatomy. An absorbent product is donned on the manikin. Synthetic urine is then delivered through an inlet positioned on the manikin toward the selected outlet on the manikin.

According to still another aspect of the invention, a kit is provided for demonstrating an absorbent product. The kit includes constituents of synthetic urine and a torso-shaped manikin on which an absorbent product can be donned. The manikin has an inlet positioned to receive the synthetic urine, an outlet positioned to be covered by a donned absorbent product, and a passageway positioned to direct the synthetic urine from the inlet toward the outlet.

BRIEF DESCRIPTION OF THE DRAWINGS

Aspects of the invention will now be described with reference to exemplary embodiments selected for illustration in the figures, of which.

DETAILED DESCRIPTION OF THE INVENTION

Figure 1:
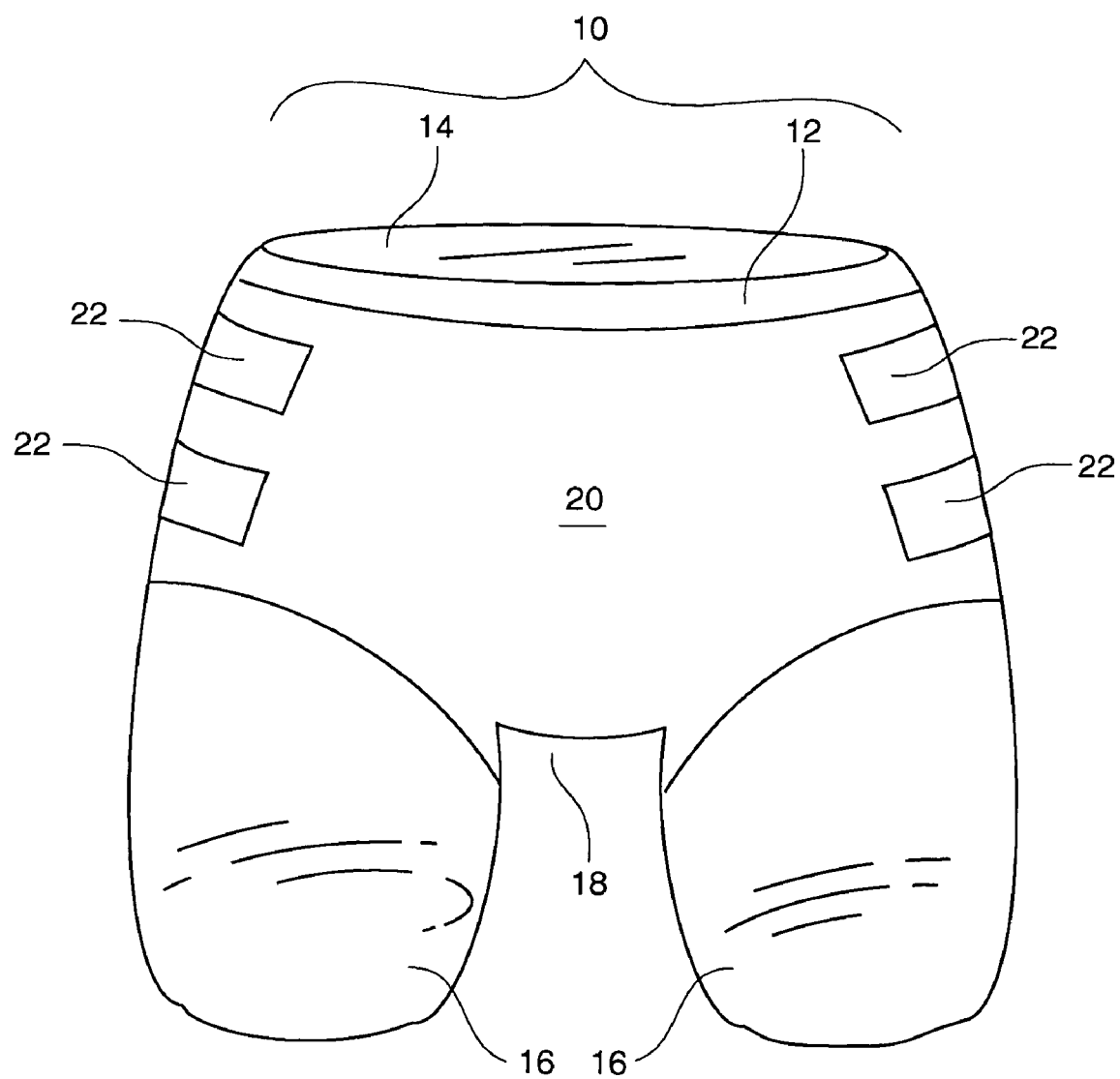
FIG. 1 is a front view of an exemplary embodiment of a torso-shaped manikin, donned with an absorbent product, according to an aspect of this invention.

Although the invention is illustrated and described herein with reference to specific embodiments, the invention is not intended to be limited to the details shown. Rather, various modifications may be made in the details within the scope and range of equivalents of the claims and without departing from the invention.

Referring generally to the figures, an apparatus is provided for demonstrating an absorbent product according to one aspect of the invention. The apparatus includes a torso-shaped manikin 112, 312 on which an absorbent product 20 can be donned.

An inlet 140, 340A, 340B is positioned on the manikin 112, 312 to receive synthetic urine, a first outlet 148, 348 is positioned on the manikin 112, 312 to correspond to male anatomy, and an optional second outlet 144, 344 is positioned on the manikin 112, 312 to correspond to female anatomy. A passageway 152, 252, 352A, 352B is positioned in the manikin 112, 312 to direct synthetic urine from the inlet 140, 340A, 340B toward the first and/or second outlets 144, 148, 344, 348.

The manikin 112, 312 optionally has a deflated condition and an inflated condition, wherein the absorbent product 20 can be donned on the manikin 112, 312 in the inflated condition. According, the manikin 112, 312 is optionally provided with an air inlet port 136, 336 positioned to receive inflation air.

The inlet 140, 340A, 340B for synthetic urine is optionally positioned on an upper portion of the manikin 112, 312. For example, the inlet 140, 340A, 340B is optionally positioned on a top surface 114, 314 of the manikin 112, 312. Also, the inlet 140, 340A, 340B is optionally configured to receive synthetic urine from a syringe (not shown).

When the manikin 112, 312 has first and second outlets 144, 148, 344, 348, the apparatus is optionally provided with a removable cap 146, 150, 346, 350 to open and close the first outlet or the second outlet 144, 148, 344, 348, and the passageway 152, 252, 352A, 352B is optionally defined by a conduit or tube extending from the inlet 140, 340A, 340B toward the first outlet and the second outlet 144, 148, 344, 348. To deliver synthetic urine to the outlets, the passageway 152, 252 is optionally divided into two branches 156, 158, 256, 258, one extending toward the first outlet and another extending toward the second outlet.

Alternatively, when the manikin 112, 312 has first and second outlets 144, 148, 344, 348, the inlet is optionally defined by first and second ports 340A, 340B. If so, the passageway is optionally defined by a first conduit or tube 352A extending from the first port 342A toward the first outlet 344 and a second conduit or tube 352B extending from the second port 342B toward the second outlet 348.

To facilitate demonstration of the absorbent product 20, the manikin 112, 312 is optionally formed from a substantially translucent material. The material is optionally clear to maximize visualization of the interior of the manikin 112, 312.

To demonstrate an absorbent product 20 on a manikin 112, 312 having first and second outlets 144, 148, 344, 348, an outlet is selected from a first outlet 148, 348 positioned on the manikin 112, 312 corresponding to male anatomy and a second outlet 144, 344 positioned on the manikin 112, 312 corresponding to female anatomy. An absorbent product 20 is donned on the manikin 112, 312. Synthetic urine is then delivered through an inlet 140, 340A, 340B positioned on the manikin 112, 312 toward the selected outlet 144, 148, 344, 348 on the manikin 112, 312.

When an inflatable torso-shaped manikin 112, 312 is used, the demonstration optionally includes the step of inflating the manikin 112, 312 from a deflated condition to an inflated condition. Also, when the manikin 112, 312 (inflatable or not) includes multiple outlets 144, 148, 344, 348, the step of selecting an outlet optionally includes removing a cap from an outlet or adding a cap to an outlet.

According to another aspect of the invention, a kit is provided for demonstrating an absorbent product 20. The kit includes constituents of synthetic urine and the torso-shaped manikin 112, 312 on which an absorbent product 20 can be donned. The manikin 112, 312 has an inlet 140, 340A, 340B positioned to receive the synthetic urine, at least one outlet 144, 148, 344, 348 positioned to be covered by a donned absorbent product 20, and a passageway 152, 252, 352A, 352B positioned to direct the synthetic urine from the inlet toward the outlet. If the manikin 112, 312 is inflatable, the kit optionally includes a pump for inflating the manikin 112, 312 from a deflated condition to an inflated condition.

Also, the constituents of the synthetic urine of the kit optionally include ammonia and a chemical that changes color when exposed to ammonia. That chemical is optionally phenolphthalein. Accordingly, the synthetic urine that is formed using the kit optionally includes water, ammonia, and phenolphthalein.

The kit can also include an absorbent article. For example, the kit can include a diaper, an undergarment, a pad, or another form of absorbent article.

The kit closely approximates the actual act of urination, and the result it has on a brief or other absorbent article being worn. According to one exemplary embodiment, the kit includes the following components:

A carrying case with an optional shoulder strap.

An inflatable torso that has an inlet tube feeding both male and female outlet ports. In use, one can simply choose the gender being demonstrated and cap off the other outlet. The torso can be sized such that size large briefs are the appropriate fit.

An electric air pump (with attachments) that plugs into any standard wall outlet and completely inflates the torso quickly (e.g., in less than two minutes).

A pair of safety glasses for the user to wear while conducting the demonstration.

A pH test kit that includes small containers of both ammonia and phenolphthalein, a chemical that changes color when it detects the presence of ammonia.

A supply of Super Absorbent Polymer (SAP) granules, such as those used in the manufacture or construction of absorbent products.

A graduated beaker (e.g., 400 cc) to mix a synthetic urine (e.g., a water-ammonia-phenolphthalein solution).

A syringe (e.g., 140 cc) to inject the synthetic urine into the inlet port of the torso, where it will flow through one of the outlet ports.

The kit is used to perform one or more of the following demonstrations: an Initial SAP Demo (to demonstrate the absorbency characteristics of SAP), a Secondary SAP Demo (to demonstrate the SAP's ability to encapsulate ammonia molecules that can cause odor and lead to skin breakdown), a Countertop Demo (to show how SAP works in an adult brief), and an Inflatable Torso Demo (to closely simulate a brief in actual use). Exemplary embodiments of these demonstrations are described in the following sections.

Initial SAP Demo

Begin by using warm water to more closely approximate the temperature of urine leaving the body.

Fill the graduated beaker to about 300 cc (roughly the volume of a normal healthy adult void).

Pour about two tablespoons of SAP into the beaker of warm water, after which the SAP will begin to absorb the water, transforming the SAP into a gel-like substance.

Dispose of the gel in a sanitary manner.

Secondary SAP Demo

Once again fill the beaker with 300 cc of warm water. Add approximately 6-8 squirts of ammonia from its container (each squirt should contain about 3-4 drops).

Add approximately 2 squirts of phenolphthalein to the beaker, after which the solution will turn pink/magenta.

Pour about two tablespoons of SAP into the colored solution, after which the SAP will begin to absorb water, and the resultant gel will start to change from colored to clear.

Dispose of the gel in a sanitary manner.

Countertop Demo

Fill the beaker with 300 cc of warm water. Add ammonia and phenolphthalein as previously described so that the solution changes color.

Hold a brief completely open and flat on the table, absorbent side up.

Slowly pour the solution from the beaker straight up and down the length of the absorbent portion of the brief. Although it starts out pink, the SAP in the absorbent portion of the brief will begin to neutralize the ammonia and the absorbent portion will become clear of any color.

Inflatable Torso Demo

Though the countertop "pH Pour Test" is a stunning visual demonstration (because it shows how the SAP in an adult brief not only absorbs fluid, but also encapsulates and neutralizes those ammonia molecules associated with the bacterial breakdown of urine that cause an objectionable odor as well as skin breakdown), a brief that is actually "in use" works in three dimensions, conforming to multiple shapes and sizes (i.e. the curves and contours of the wearer's body).

Use the electric air pump to fully inflate the torso.

Select which gender you want to demonstrate and cap off the other port; in an exemplary embodiment of the torso, the higher port simulates male use while the lower port simulates female use.

Fit a size large brief to the torso.

Fill the beaker with 300 cc of warm water. Add ammonia and phenolphthalein as previously described so that the solution changes color.

Put on the safety glasses and, using the 140 cc syringe, draw a full load of the solution by inserting the tip into the solution and withdrawing the plunger.

Insert the tip of the syringe into the inlet port on top of the torso, and depress the plunger.

Repeat the process by injecting another full syringe of solution. This will total 280 cc—approximately a full healthy adult void.

The torso can be deflated by inserting an adapter into the air inlet valve and applying pressure to force the air out.

Referring now to the exemplary embodiments of the invention selected for illustration in the Figures, FIG. 1 illustrates a demonstration system 10 that is useful for demonstrating the use and/or performance of an absorbent product. The demonstration system 10 includes a torso 12 having a top surface 14, thigh portions 16, and a crotch 18 defined by the thigh portions 16. The torso 12 may be formed from a variety of rigid or flexible materials. According to one exemplary embodiment, torso 12 is inflatable and may be formed from a flexible plastic material such as vinyl. Torso 12 is optionally translucent or transparent in order to assist with the visualization of the interior surfaces of an absorbent product donned on the torso 12.

The demonstration system 10 also includes an absorbent product 20 that has a system of fasteners 22 positioned and configured to hold the absorbent product 20 in place on a user of the absorbent product and, for purposes of demonstration, on the torso 12.

The demonstration system 10 illustrated in FIG. 1 can be used to illustrate the fit of an absorbent product (such as absorbent product 20) on a torso of a user, simulated by torso-shaped manikin 12. In an embodiment in which the torso 12 is inflatable, the portability of the torso 12 is improved so that a demonstration for the fit and/or performance of larger size absorbent products (such as adult briefs) can be easily performed at a variety of venues. While torso 12 may be best suited for larger sized absorbent products such as adult briefs, however, the torso 12 can also be used to demonstrate the use and/or performance of diapers, pads, and other forms of absorbent products.

Figure 2:
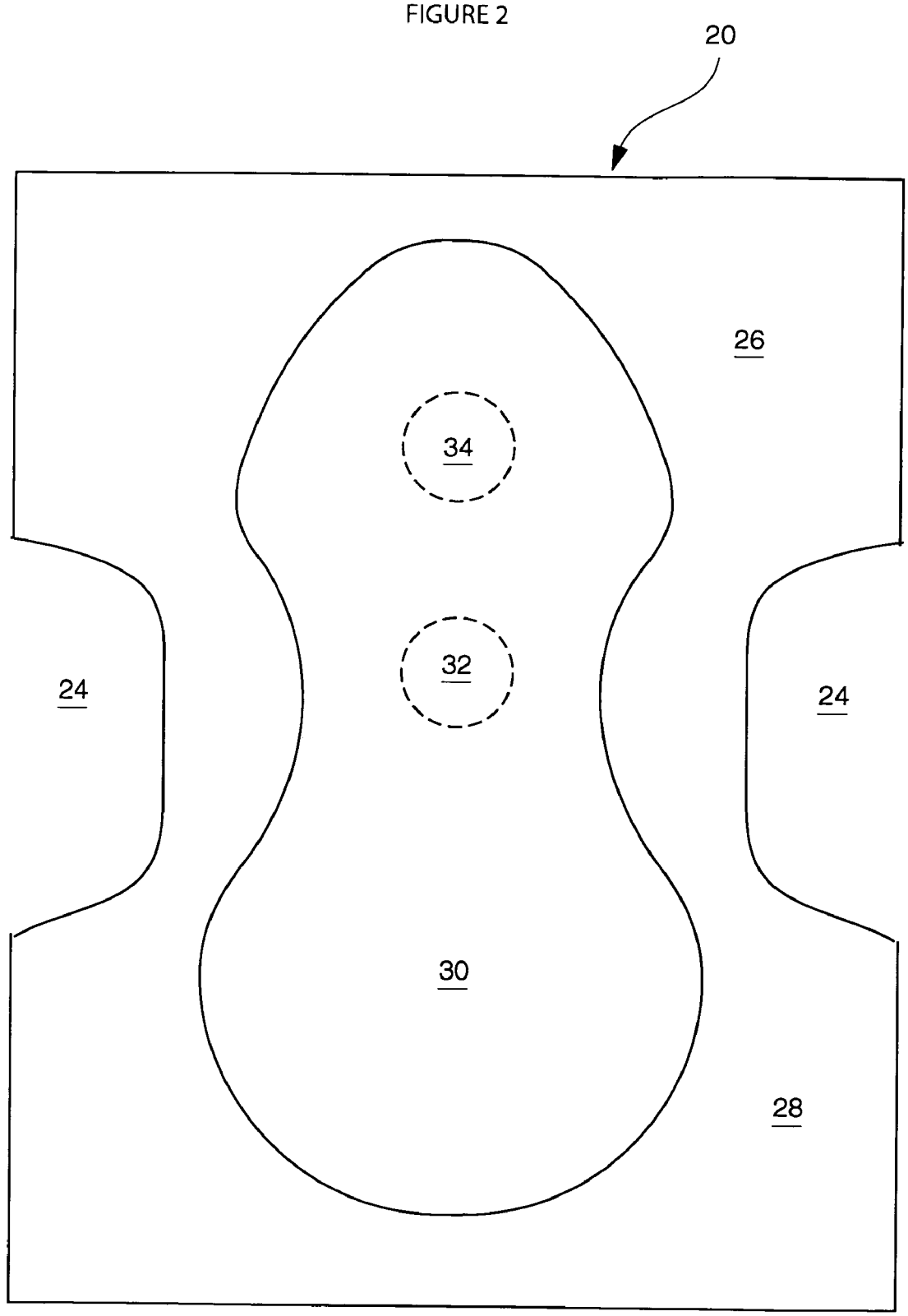
FIG. 2 is a plan view of an exemplary embodiment of an absorbent product that can be demonstrated according to an aspect of this invention.

FIG. 2 illustrates an exemplary embodiment of the absorbent product 20 shown in FIG. 1, in a flattened condition. While a variety of absorbent products may be demonstrated according to this invention, exemplary embodiments of absorbent products are illustrated and described in U.S. Pat. Nos. 6,607,515; Des. 489,821; and Des. 472,351, which are incorporated herein by reference. In the illustrated embodiment, the absorbent product 20 includes leg cutouts 24 positioned to conform to the contours of the anatomy of a user. Absorbent product 20 also includes a front section 26 positioned and shaped to be held against the front of a user and a back section 28 positioned and shaped to be held against the back of a user. Fasteners (not shown) are used to fasten the front section 26 and back section 28 in order to don the absorbent product 20 on a user. It will be understood, therefore, that the front section 26, back section 28, and leg cutouts 24 cooperate to form an absorbent product 20 having a waist with leg openings when the absorbent product 20 is donned on a user.

The absorbent product 20 also includes an absorbent core portion 30 which is configured to absorb fluids, such as urine, from a user of the absorbent product 20. In the case of an adult brief, for example, urine is absorbed in the absorbent core 30 after discharge from an adult due perhaps to incontinence. If absorbent product 20 is a diaper, then the absorbent core 30 is configured to receive urine and bowel movements from a child or infant. Exemplary structures of absorbent core 30 are described in the aforementioned patents, each of which is incorporated herein by reference.

As is illustrated in FIG. 2, the absorbent core 30 includes a female insult zone 32 and a male insult zone 34. It will be understood that the female insult zone 32 corresponds to the female anatomy. In other words, a discharge of urine from a female will be likely to first contact absorbent core 30 in the region of female insult zone 32. Similarly, urine discharged from a male will be likely to first contact absorbent core 30 in the region of male insult zone 34. Ideally, an absorbent core 30 will be sized, shaped, and otherwise configured to accommodate insults from a male and a female, and the ability of an absorbent core such as absorbent core 30 to accommodate all such insults can be demonstrated according to this invention.

Figure 3:
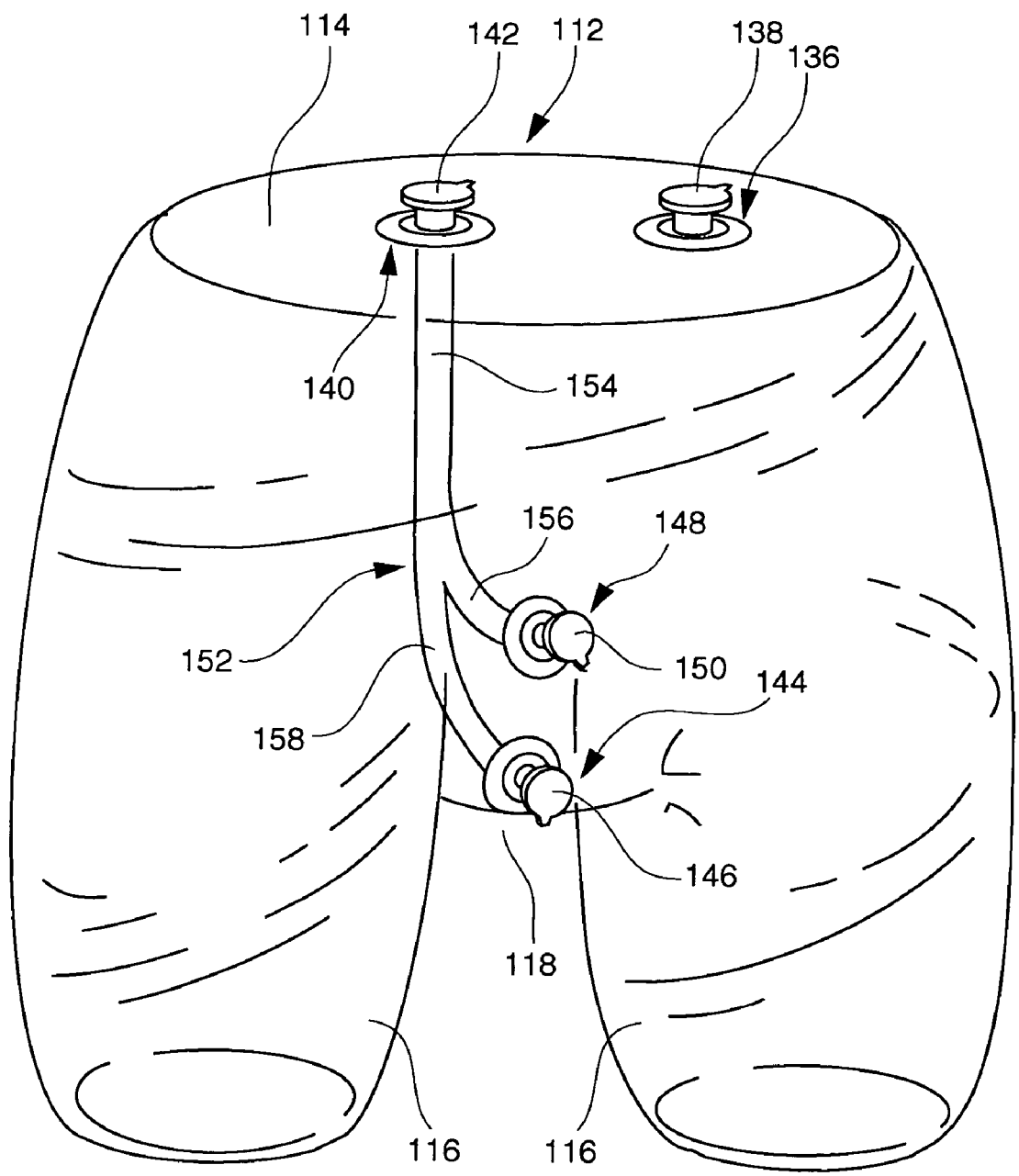
FIG. 3 is a perspective view of the torso-shaped manikin shown in FIG. 1, with the absorbent product removed.

Referring now to FIG. 3, an exemplary embodiment of a torso 112 is illustrated. Torso 112 has a top surface 114, thigh portions 116, and a crotch 118 defined by the thigh portions 116. Torso 112 is formed from a inflatable body that can be alternated between a deflated condition (not shown) and the inflated condition shown in FIG. 3. To facilitate inflation of torso 112 from a deflated condition to an inflated condition, torso 112 is provided with an inflation port 136 on the top surface 114 of the torso 112. Though shown on top surface 114, inflation port 136 can be provided on any surface of the torso 112. In order to retain air within the inflated torso 112, to retain the inflated condition, inflation port 136 is provided with a cap 138.

Torso 112 is also provided with components that permit the simulation of urination by a user of an absorbent product. The torso 112 therefore includes means by which a fluid such as synthetic urine can be introduced into the torso 112 and discharged by the torso 112 in a manner that simulates urination by a child, infant, adult or other user of the absorbent product.

According to the exemplary embodiment illustrated in FIG. 3, torso 112 is provided with an inlet port 140 through which synthetic urine or other fluid can be introduced into the interior of torso 112. The inlet port 140 is optionally configured to receive fluid from a syringe, though other forms of inlet port 140 are contemplated as well. Inlet port 140 is also provided with a cap 142. Though a wide variety of ports can be utilized on a torso such as torso 112, inflation port 136 and inlet port 140 can be substantially the same, and one exemplary embodiment of inflation port 136 and inlet port 140 is that found on a beach ball or other inflatable apparatus, for example.

Torso 112 is also provided with a pair of outlets in order to simulate the anatomy of male and female users of absorbent products. These outlets correspond generally to the locations of the female insult zone 32 and male insult zone 34 of absorbent product 20 illustrated in FIG. 2.

More specifically, torso 112 is provided with an outlet port 144 that corresponds in location to the female anatomy. For example, outlet port 144 is located on torso 112 and in a position corresponding to the exit of the female urethra. Outlet port 144 is provided with a cap 146 that is configured to prevent the flow of fluid through the outlet port 144.

Torso 112 is also provided with an outlet port 148 corresponding to the male anatomy. Specifically, the position of outlet port 148 on torso 112 corresponds generally to the outlet of the male urethra. Like outlet port 144, outlet port 148 is provided with a cap 150 to prevent flow of fluid.

It will be understood from the foregoing description of outlet port 144 and outlet port 148 that the outlet port 144 generally corresponds in location to the position of female insult zone 32 on absorbent product 20, and outlet port 148 corresponds generally to the position of male insult zone 34 on absorbent product 20. Accordingly, when absorbent product 20 is donned on torso 112, the ability of the absorbent core 30 of the absorbent product 20 to handle an insult from a male (simulated by delivering fluid through outlet port 148) and from a female (simulated by delivering fluid through outlet port 144) can be demonstrated.

In order to direct flow from the inlet port 140 of torso 112 to the outlet ports 146 and 148, torso 112 is provided with a passageway 152 extending from the inlet port 140 and toward the outlet ports 144 and 148. Specifically, passageway 152 includes an upstream portion 154 coupled to the inlet port 140 to receive fluid. Passageway 152 branches to deliver fluid to outlet ports 144 and 148. Specifically, upstream portion 154 of passageway 152 branches into a downstream portion 156 (which directs fluid toward outlet port 148) and a downstream portion 158 (which directs fluid toward outlet port 144).

As will be described separately herein, the opening or removal of a cap 146 or 150 will permit the flow from an outlet port 144 or 148, respectively. By manipulating caps 146 and 150, therefore, fluid introduced into the inlet port 140 can be directed to an appropriate outlet port 144 or 148 in order to demonstrate the use of an absorbent product 20 by a male or a female.

Figure 4:
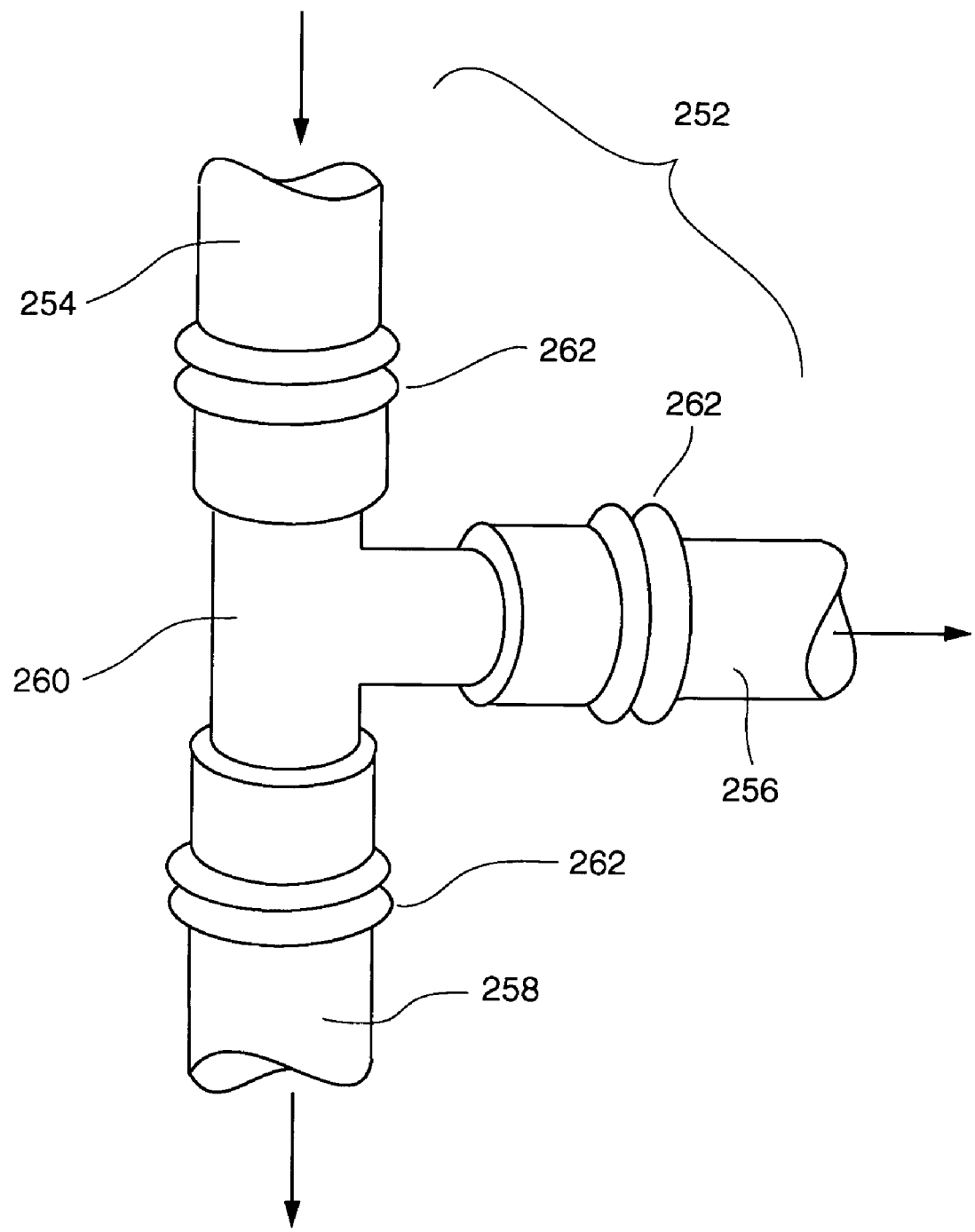
FIG. 4 is a plan view of a portion of the torso-shaped manikin shown in FIG. 3.

Referring now to FIG. 4, a portion of an embodiment of a passageway 252 is illustrated schematically. The portion of passageway 252 illustrated in FIG. 4 corresponds to the location at which the upstream portion 154 shown in FIG. 3 branches into downstream portions 156 and 158. The arrows indicated in FIG. 4 generally show the direction of fluid flow.

Passageway portion 252 includes an upstream portion 254 and downstream portions 256 and 258. A "T" connection 260 is provided to couple the upstream portion 254 to the downstream portions 256 and 258. Barbed connections 262 on the "T" connection 260 provide for a sealed connection between the portions of tubing that form the upstream and downstream portions 254, 256, and 258.

Although a wide variety of materials can be utilized to form the passageway 252, the upstream and downstream portions 254, 256, and 258 are optionally formed from clear or translucent, flexible tubing. Though rigid and opaque conduits are contemplated as well, such conduits are somewhat less suited for an inflatable embodiment of a torso 112.

Figure 5:
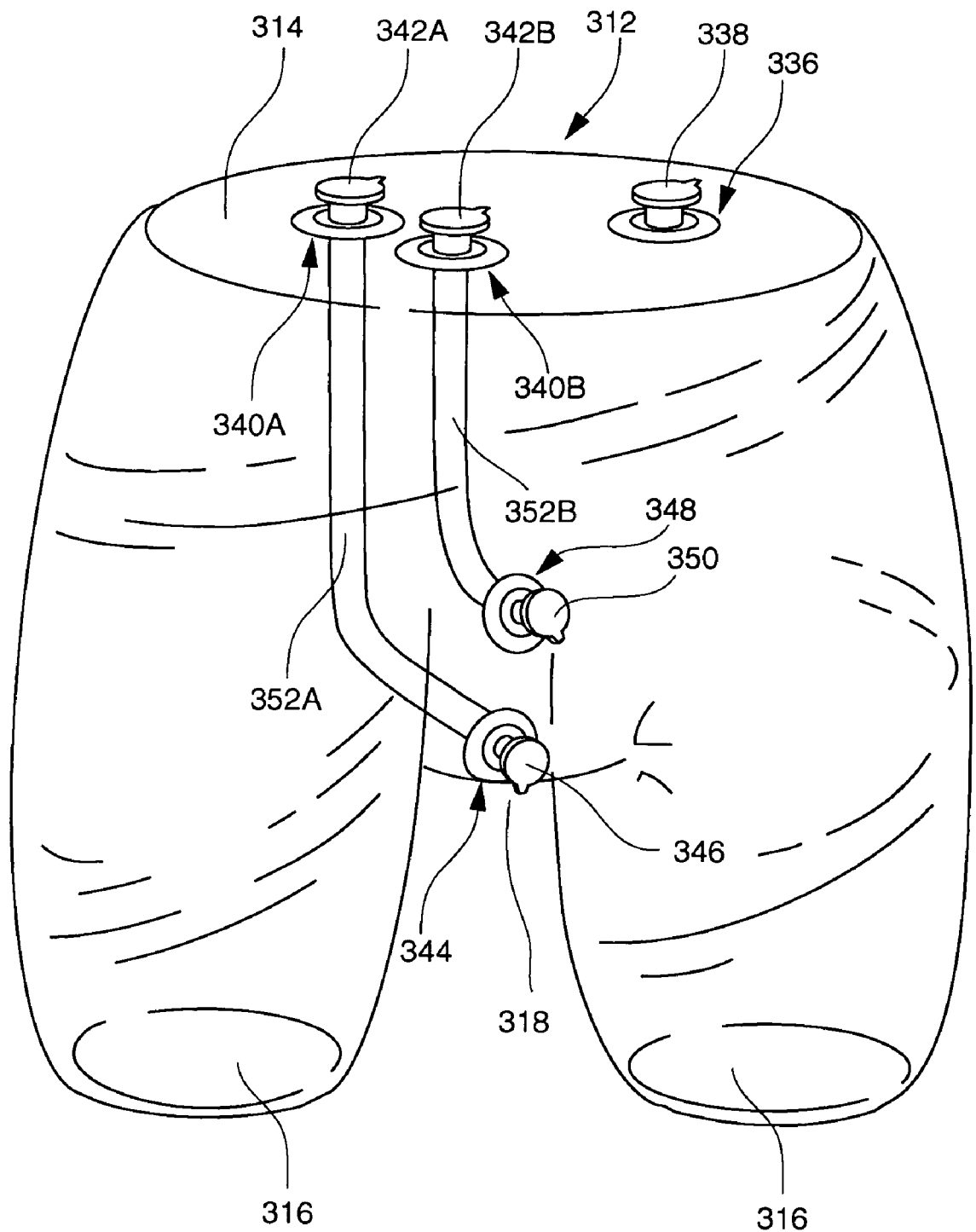
FIG. 5 is a perspective view of another exemplary embodiment of a torso-shaped manikin according to an aspect of this invention.

Referring now to FIG. 5, another embodiment of a torso-shaped manikin 312 is illustrated. Torso 312 is similar to torso 112 in that it includes a top surface 314, leg or thigh portions 316, and a crotch portion 318 defined by the thigh portions 316. Also, like torso 112, torso 312 includes an inflation port 336, having a cap 338, for the introduction of air into the torso 312 to change the torso 312 from a deflated condition to an inflated condition (shown).

Torso 312 differs from torso 112 in that torso 312 includes plural inlets dedicated to plural outlets and plural passageways for connecting inlets to respective outlets. More specifically, torso 312 includes a pair of inlet ports 340A and 340B, each having a respective cap 342A and 342B. Torso 312 has an outlet port 344 corresponding to the female anatomy and an outlet port 348 corresponding to the male anatomy, each having a respective cap 346 and 350.

A dedicated or direct fluid flow connection is provided between inlet port 340A and outlet port 344 by means of a passageway 352A. Similarly, a dedicated fluid flow communication is provided between inlet port 340B and outlet port 348 by means of passageway 352B. By virtue of having separate, dedicated inlet ports 340A and 340B, the branching of the upstream portion 154 of passageway 152 into downstream portions 156 and 158 can be eliminated. Also, the utilization of a "T" connection 260 in passageway 252 (FIG. 4) can also be eliminated.

While the embodiments of the torso 112 and 312 illustrate exemplary inlet and outlet ports, it should be recognized that fewer or greater inlet and outlet ports can be utilized according to this invention. In other words, while torso 112 includes a single inlet port, the inlet port can be eliminated entirely or any number of inlet ports can be used. Similarly, although both torso 112 and torso 312 include two outlet ports (corresponding to male and female insult zones 32 and 34 in FIG. 2), the outlet ports can be eliminated or additional outlet ports can be added in order to introduce fluid to other locations of an absorbent product. Accordingly, a torso-shaped manikin according to this invention can be provided without any inlet or outlet ports (e.g., for the demonstration of the fit of an absorbent product) or can be provided with any number of inlet and outlet ports in order to demonstrate the use or performance of an absorbent product, as needed.

Although a torso-shaped manikin according to this invention has been discussed in connection with use or performance demonstrations, such a manikin is also beneficially used to test the performance of absorbent products. For example, in the product development environment, a manikin according to this invention is optionally used to test the performance of a prototype of an absorbent product concept to ensure that it meets identified performance criteria. Also, in the quality assurance and control environments, a manikin according to this invention can be used to test the performance of manufactured absorbent products, or components of such products, to ensure that they meet identified quality criteria.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An apparatus for demonstrating an absorbent product, said apparatus comprising:
    a torso-shaped manikin on which an absorbent product can be donned, the manikin having a surface defining an interior;
    an inlet positioned on a top surface of said manikin to receive synthetic urine;
    a first outlet positioned on said manikin to correspond to male anatomy;
    a second outlet positioned on said manikin to correspond to female anatomy; and
    a passageway positioned entirely within the interior of said manikin and couples to the inlet to direct synthetic urine from said inlet toward said first and second outlets,
    a divider being positioned along said passageway and dividing said passageway into two branches, one branch of said passageway coupled to said first outlet and another branch of said passageway coupled to said second outlet, wherein the first outlet and the second outlet are configured to be selectively opened to permit flow of synthetic urine through the first outlet or the second outlet.

2. The apparatus of claim 1, said manikin having a deflated condition and an inflated condition, wherein the absorbent product can be donned on said manikin in said inflated condition.

3. The apparatus of claim 2, said manikin further comprising an air inlet port positioned to receive inflation air.

4. The apparatus of claim 1, said inlet being positioned on an upper portion of said manikin.

5. The apparatus of claim 1, said inlet being configured to receive synthetic urine from a syringe.

6. The apparatus of claim 1, further comprising a removable cap to open and close said first outlet or said second outlet.

7. The apparatus of claim 1, said passageway being defined by a conduit or tube extending from said inlet toward said first outlet and said second outlet.

8. The apparatus of claim 1, said inlet being defined by first and second ports.

9. The apparatus of claim 8, said passageway being defined by a first conduit or tube extending from said first port toward said first outlet and a second conduit or tube extending from said second port toward said second outlet.

10. The apparatus of claim 1, said manikin being substantially translucent.

11. The apparatus of claim 1, said divider being a connector.

12. The apparatus of claim 11, said connector being a T-connection.

13. An apparatus for demonstrating an absorbent product, said apparatus comprising:
an inflatable torso-shaped manikin on which an absorbent product can be donned, said manikin having a deflated condition and an inflated condition, wherein the absorbent product can be donned on said manikin in said inflated condition;
an inlet positioned on a top surface of said manikin to receive synthetic urine;
a first outlet positioned on said manikin to correspond to male anatomy;
a second outlet positioned on said manikin to correspond to female anatomy; and
a tubular passageway positioned entirely within an interior of said manikin, said tubular passageway being connected to the inlet and to said first and second outlets to direct synthetic urine through the interior of said manikin from said inlet to said first and second outlets, wherein said inlet is positioned at an elevation above said at least one outlet when said manikin is positioned in an upright position, thereby facilitating the flow of synthetic urine through said tubular passageway from said inlet to said and second outlets.

14. The apparatus of claim 13, said manikin further comprising an air inlet port positioned to receive inflation air.

15. The apparatus of claim 13, said inlet being positioned on an upper portion of said manikin.

16. The apparatus of claim 15, said inlet being positioned on a top surface of said manikin.

17. The apparatus of claim 13, said inlet being configured to receive synthetic urine from a syringe.

18. The apparatus of claim 13, said passageway being defined by a conduit or tube extending from said inlet toward said outlet.

19. The apparatus of claim 13, said manikin being substantially translucent.

20. A method for demonstrating an absorbent product using a manikin, said method comprising the steps of:
selecting an outlet from a first outlet positioned on a surface of the manikin corresponding to male anatomy and a second outlet positioned on the surface of the manikin corresponding to female anatomy;
donning an absorbent product on the manikin;
delivering synthetic urine through an inlet positioned on a top surface of the manikin toward the selected outlet on the manikin, wherein the inlet is positioned at an elevation above the first outlet and the second outlet in an upright position of the manikin such that synthetic urine flows through a passageway positioned within an interior of the manikin and out of the selected first and second outlet.

21. The method of claim 20, further comprising the step of inflating the manikin from a deflated condition to an inflated condition.

22. The method of claim 20, said selecting step comprising removing a cap from an outlet or adding a cap to an outlet.

23. A kit for demonstrating an absorbent product, said kit comprising:
constituents of synthetic urine; and
a torso-shaped manikin on which an absorbent product can be donned, said manikin having an inlet positioned on a top surface of said manikin to receive said synthetic urine, at least two outlets positioned on another surface of said manikin to be covered by a donned absorbent product, and a tubular passageway positioned entirely within an interior of the manikin to direct said synthetic urine from inlet towards said outlets, wherein said tubular passageway divides into at least two flow paths, each of which terminates at a respective outlet such that synthetic urine flows out of the manikin through a selected outlet, said outlet of said manikin comprising first and second outlet ports, said first outlet port corresponding to male anatomy and said second outlet port corresponding to female anatomy.

24. The kit of claim 23, further comprising a removable cap to open and close said first outlet port or said second outlet port.

25. The kit of claim 23, said manikin having a deflated condition and an inflated condition, wherein the absorbent product can be donned on said manikin in said inflated condition.

26. The kit of claim 25, further comprising a pump for inflating said manikin from said deflated condition to said inflated condition.

27. The kit of claim 25, said constituents comprising ammonia.

28. The kit of claim 27, said constituents comprising a chemical that changes color when exposed to ammonia.

29. The kit of claim 28, said chemical being phenolphthalein.

30. The kit of claim 23, said synthetic urine comprising water, ammonia, and phenolphthalein.

31. The kit of claim 23, further comprising an absorbent article.

32. The kit of claim 31, said absorbent article being a diaper, an undergarment, or a pad.

* * * * *